(12) United States Patent
Drescher et al.

(10) Patent No.: US 7,143,211 B2
(45) Date of Patent: Nov. 28, 2006

(54) MEMORY CONFIGURATION WITH I/O SUPPORT

(75) Inventors: Wolfram Drescher, Dresden (DE); Volker Aue, Dresden (DE)

(73) Assignee: Systemonic AG, Dresden (DE)

( * ) Notice: Subject to any disclaimer, the term of this patent is extended or adjusted under 35 U.S.C. 154(b) by 304 days.

(21) Appl. No.: 10/399,073

(22) PCT Filed: Oct. 15, 2001

(86) PCT No.: PCT/DE01/03916

§ 371 (c)(1),
(2), (4) Date: Sep. 10, 2003

(87) PCT Pub. No.: WO02/31658

PCT Pub. Date: Apr. 18, 2002

(65) Prior Publication Data

US 2004/0054856 A1    Mar. 18, 2004

(30) Foreign Application Priority Data

Oct. 13, 2000  (DE) ................................ 100 50 980

(51) Int. Cl.
*G06F 3/00* (2006.01)
*G06F 13/00* (2006.01)

(52) U.S. Cl. ............................. 710/52; 710/22; 710/33; 710/12; 710/310

(58) Field of Classification Search .................... 710/1, 710/22–35, 52–60, 107, 305–317, 147–149, 710/31–145, 8–12; 365/230; 711/147–149, 711/31–145

See application file for complete search history.

(56) References Cited

U.S. PATENT DOCUMENTS

| | | | | |
|---|---|---|---|---|
| 4,571,671 A | * | 2/1986 | Burns et al. | 710/35 |
| 5,490,263 A | * | 2/1996 | Hashemi | 711/149 |
| 5,968,146 A | * | 10/1999 | Tanaka et al. | 710/39 |
| 6,067,595 A | * | 5/2000 | Lindenstruth | 710/307 |
| 6,134,155 A | | 10/2000 | Wen | 365/189.04 |
| 6,166,963 A | | 12/2000 | Wen | 365/189.04 |
| 6,212,122 B1 | | 4/2001 | Wen | 365/230.05 |
| 6,223,236 B1 | * | 4/2001 | Kori | 710/120 |
| 6,259,650 B1 | | 7/2001 | Wen | 365/233 |
| 6,907,480 B1 | * | 6/2005 | Takei et al. | 710/52 |

FOREIGN PATENT DOCUMENTS

| | | |
|---|---|---|
| DE | 19526798 | 5/1997 |
| DE | 19713178 | 10/1998 |

(Continued)

OTHER PUBLICATIONS

"New Fifo Architecture For High Performance Applications" by Jeff Hall; *Wescon Technical Papers, Western Periodicals Co.*, Bd. 33, 1; Nov. 1989; pp. 141-145.

"Bidirectional Fifo In the Processor To Peripheral Communications" by Juli S. Lin; *Wescon Technical Papers, Western Periodicals Co.*, Bd. 33, 1; Nov. 1989; pp. 131-136.

(Continued)

*Primary Examiner*—Christopher Shin
(74) *Attorney, Agent, or Firm*—Baker Botts L.L.P.

(57) ABSTRACT

The invention relates to a method for configuring a memory with I/O support. The aim of the invention is to guarantee the processor and I/O functional units that function in time-critical conditions the appropriate priority for data access, using simple programs. To this end, an input memory area which the I/O unit can only write into and which the processor unit can only read out of and an output memory area which the I/O unit can only read out of and which the processor unit can only write into are specified in the processor.

7 Claims, 1 Drawing Sheet

FOREIGN PATENT DOCUMENTS

| | | |
|---|---|---|
| DE | 19941196 | 12/2000 |
| EP | 0241129 | 10/1987 |
| EP | 0416281 | 3/1991 |
| EP | 0483441 | 5/1992 |
| EP | 0550163 | 7/1993 |
| EP | 0617530 | 9/1994 |
| WO | 9844421 | 10/1998 |

OTHER PUBLICATIONS

Lin, JC. (1989) "Bidirectional Fifo in the Processor-to-Peripheral Communications", Wescon Technical Papers, Western Periodicals Co., vol. 33: pp. 131-136.

Hall J. (1989) "New Fifo Architecture for High Performance Applications", Wescon Technical Papers, Western Periodicals Co., vol. 33: pp. 141-145.

* cited by examiner

MEMORY CONFIGURATION WITH I/O SUPPORT

BACKGROUND OF THE INVENTION

The invention relates to a method for memory configuration with input/output [I/O] support, for the storage of data from a processor unit in a processor memory and its input/output via an I/O unit. The invention also relates to an arrangement for carrying out the method.

To avoid heavily loading the CPU with memory management tasks in computers with functional units that must achieve a high data throughput, it is customary to use direct memory access (DMA) units which take over memory management tasks and can independently operate the address and data sides of the memory.

A disadvantage DMA units is that a great deal of programming effort is required in order to ensure that, in operation with multiple functional units, the functional unit operating under especially time-critical conditions, e.g. a processor unit, receives the appropriate priority in data access. A further disadvantage is that a certain time delay always occurs in a DMA request before the required memory access is ready.

It is an object of the invention is to permit a functional unit operating under time-critical conditions, e.g. a processor unit, to have direct memory access that is as delay-free as possible, and in doing so to avoid data collisions that can occur when operating with additional functional units, e.g. an I/O functional unit with direct memory access.

SUMMARY OF THE INVENTION

The method in accordance with the invention makes provision that, in the processor memory, an input memory area is specified which the I/O unit can only write and which the processor unit can only read, and that an output memory area is specified that the I/O unit can only read and the processor unit can only write.

In this context, delay-free READ or WRITE memory access is guaranteed by direct assignment of the memory area to the functional units. Moreover, data collisions are prevented by the fundamental specification regarding the READ/WRITE access that is possible in each memory area, in that the course of the bidirectional data paths from the I/O unit and processor unit is defined.

An important variant of the method provides that the data accesses by the I/O unit and the processor unit when reading or writing the input memory area and the output memory area of the processor memory are each implemented independently. This avoids loading the CPU with memory management tasks.

A special variant of the method provides that the data accesses by the I/O unit and the processor unit when reading or writing the input memory area and the output memory area of the processor memory are each implemented in a block with a block length that corresponds to the line length of the processor memory organization. This solution is advantageously used when data accesses by the functional units are performed frequently or exclusively with a specific block length. In this way, the number of command instructions that must be issued by the CPU is reduced.

In accordance with the invention there is provided a processor arrangement wherein a data port of the processor unit is connected to a first data port of the processor memory and a data port of the I/O unit is connected to a second data port of the processor memory. Provision is made with regard to the arrangement in order to implement the method of direct data access of the I/O functional unit and the processor functional unit that a suitable multiple data port is also implemented in the processor memory and this multiple data port is connected to the corresponding data ports of the functional units.

A processor arrangement in accordance with the invention provides that an I/O address generator is arranged in the I/O unit and a processor address generator is arranged in the processor unit. This makes possible the independent capability of addressing the data accesses by the above-mentioned functional units. Provision may further be made that the processor memory is also equipped with a multiple address port and that an address port of the processor unit is connected to a first address port of the processor memory and that an address port of the I/O unit is connected to a second address port of the processor memory.

Moreover, READ/WRITE operation by the functional units is also ensured in that a multiple READ/WRITE port is additionally implemented on the processor memory and a READ/WRITE port of the I/O unit is connected to a first READ/WRITE port of the processor memory, and that a READ/WRITE port of the processor unit is connected to a second READ/WRITE port of the processor memory.

A desirable solution concerning a processor arrangement in accordance with the invention provides that one block length port is arranged at the I/O address generator and another block length port is arranged the processor address generator. In this way, the capability is created to input the block lengths of the data accesses to be processed by the I/O unit and the processor unit.

An advantageous solution concerning the arrangement in accordance with the invention provides that a FIFO memory is arranged in the processor memory. Since the data path of the processor unit leads directly to the processor memory, a FIFO memory serving as a buffer memory is also arranged in the processor memory.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
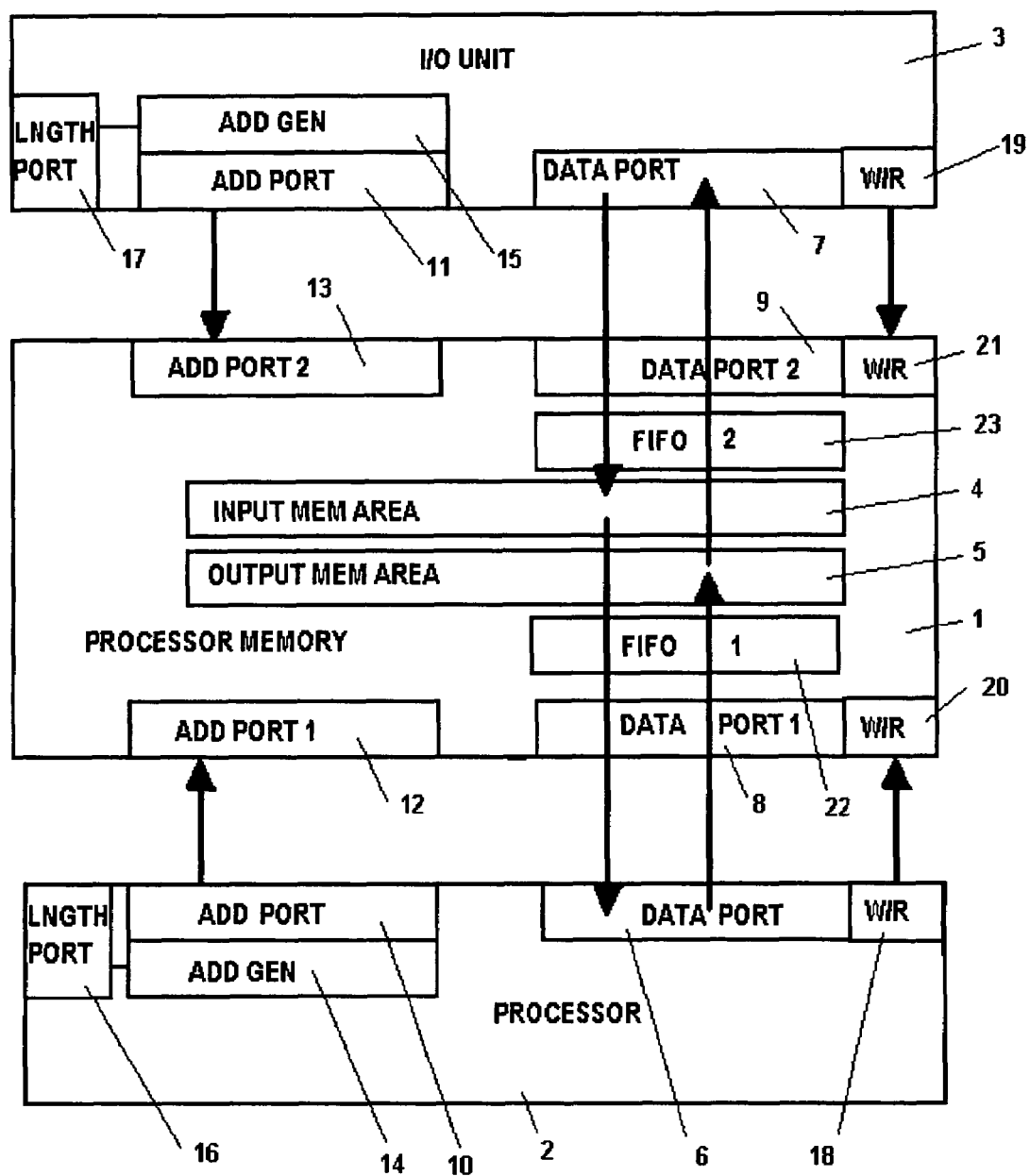
FIG. 1 is a block diagram showing a processor arrangement in accordance with an embodiment of the invention.

Shown in the associated drawing is a schematic representation of the processor memory 1 with the associated processor 2 and the associated I/O unit 3. The figure also shows that the I/O unit 3 includes an I/O unit address port 11, which is connected to the second processor memory address port 13, which in turn is located on the processor memory 1. The I/O unit address port 11 is operated by the I/O address generator 15, to which the I/O block length port 17 communicates the block length, i.e. the amount of sequential data contained in the data block in the data access, at its initialization.

In an assumed WRITE state of the I/O unit 3, the I/O READ/WRITE port 19 located thereon outputs the WRITE state to the second processor memory READ/WRITE port 21 to which it is connected, which is located on the processor memory 1. The addresses of the data blocks to be written by the I/O unit 3 to the processor memory 1 are located in the specified input memory area 4 of the processor memory 1. They are transmitted by the I/O unit address port 11 to the second processor memory address port 13 connected thereto, which is located on the processor memory 1. In this way, the data associated with these addresses pass from the I/O unit data port 7, which is arranged on the I/O unit 3, through the second processor memory data port 9 connected thereto and located on the processor memory 1, and through the second FIFO (First-In-First-Out) memory 23, which is also located on the processor memory 1, to the input memory area 4 of the processor memory 1. Here, the data are available for further processing with READ data access in the processor unit 2.

READ data access by the processor unit 2 can only take place for the specified address range of the input memory area 4, and the necessary addresses are prepared by the processor address generator 14, which is located on the processor unit 2 and has been initialized by the processor block length port 16 that is likewise located thereon. These addresses are output to the processor unit address port 10, which is located on the processor unit 2 and is connected to the first processor memory address port 12 located on the processor memory 1, and thereby operate the addressed memory cells of the input memory area 4. In the present READ state of the processor functional unit 2, the processor READ/WRITE port 18 located thereon outputs the READ state to the first processor memory READ/WRITE port 20 to which it is connected, and which is located on the processor memory 1.

A prerequisite for a successful READ access by the processor unit 2 is that the data assigned to the accessed addresses are made available for further processing in the processor functional unit 2 by the first FIFO memory 22 located on the processor memory 1 and the first processor memory data port 8 likewise located on the processor memory 1 and the processor functional unit data port 6 that is connected to said data port and is located on the processor functional unit 2.

The complementary process of WRITE data access by the processor unit 2 and READ data access by the I/O unit 3 takes place in a manner analogous to the WRITE data access by the I/O unit 3 and READ data access by the processor unit 2 described with respect to the input memory area 4, taking into account the present specification that all memory cells of the processor memory 1 contained in the data access are located in the output memory area 5 and only addresses corresponding to them are generated by the address generators 14 and 15.

While there have been described what are believed to be the preferred embodiments of the invention, those skilled in the art will recognize that other and further changes and modifications may be made thereto without departing from the spirit of the invention, and it is intended to claim all such changes and modifications as fall within the true scope of the invention.

The invention claimed is:

1. A processor arrangement comprising:
   a processor having a data port for reading and writing data;
   an input/output unit having a data port for reading and writing data; and
   a processor memory having a first and a second data port, wherein said processor data port is connected to said first processor memory data port and said input/output unit data port is connected to said second processor memory data port,
   wherein the processor memory is configured to have an input memory area and an output memory area, and wherein the processor arrangement is configured so that:
   writing data from said input/output unit is exclusively to the input memory area of said processor memory under exclusive address control of said input/output unit;
   reading data from said processor memory to said processor is exclusively from said input memory area of said processor memory under exclusive address control of said processor;
   wherein writing data from said processor is exclusively to said output memory area of said processor memory under exclusive address control of said processor; and
   wherein reading data from said processor memory to said input/output unit exclusively from said output memory area under exclusive address control of said input/output unit.

2. A processor arrangement as specified in claim 1 wherein said processor memory includes a first address port connected to an address port of said processor, wherein said first processor memory data port comprises a read/write port connected to said processor data port comprising a read write port, wherein said processor memory includes a second address port connected to an address port of said input/output unit and wherein said second processor memory data port comprises a read/write port connected to said input/output unit data port comprising a read/write port, and wherein said processor address port is responsive to a processor address generator and wherein said input/output unit address port is responsive to an input/output unit address generator.

3. A processor arrangement as specified in claim 2 wherein said processor includes a block length port coupled to said processor address generator and wherein said input/output unit includes a block length port coupled to said input/output unit address generator.

4. A processor arrangement as specified in claim 1 wherein said processor memory includes a first FIFO memory arranged for FIFO transfer of data from said processor to said input/output unit and a second FIFO memory arranged for FIFO transfer of data from said input/output unit to said processor.

5. In a processor arrangement including a processor, a processor memory and an input/output unit, a method for input and output of data, comprising:
   providing in said processor memory an input memory area and an output memory area;
   writing data from said input/output unit exclusively to the input memory area of said processor memory under exclusive address control of said input/output unit;
   reading data from said processor memory to said processor exclusively from said input memory area of said processor memory under exclusive address control of said processor;
   writing data from said processor exclusively to said output memory area of said processor memory under exclusive address control of said processor; and
   reading data from said processor memory to said input/output unit exclusively from said output memory area under exclusive address control of said input/output unit.

6. A method as specified in claim 5 wherein reading and writing to and from said processor memory by said input/output unit and said processor are implemented independently.

7. A method as specified in claim 6, wherein said processor memory is organized with a line length, and wherein said reading and writing by said processor and said input/output unit are implemented in data blocks having a block length corresponding to said line length.

* * * * *